(12) United States Patent  (10) Patent No.: US 7,488,025 B1
Roberson  (45) Date of Patent: Feb. 10, 2009

(54) TRUCK BED EXTENDER AND TELESCOPING RAMP

(76) Inventor: Andrew M. Roberson, P.O. Box 1206, Heber Springs, AR (US) 72543

( * ) Notice: Subject to any disclaimer, the term of this patent is extended or adjusted under 35 U.S.C. 154(b) by 214 days.

(21) Appl. No.: 11/460,686

(22) Filed: Jul. 28, 2006

(51) Int. Cl.
B62D 33/00 (2006.01)
(52) U.S. Cl. .................................................... 296/61
(58) Field of Classification Search ............. 296/26.08, 296/26.09, 26.1, 26.11, 50, 51, 57.1, 61; 14/69.5
See application file for complete search history.

(56) References Cited

U.S. PATENT DOCUMENTS

| | | | | |
|---|---|---|---|---|
| 3,870,170 A | * | 3/1975 | Noble et al. | 414/537 |
| 3,977,545 A | * | 8/1976 | Lloyd | 414/537 |
| 4,900,217 A | * | 2/1990 | Nelson | 414/537 |
| 5,795,125 A | * | 8/1998 | Walkden | 414/537 |
| 6,042,923 A | * | 3/2000 | Lewis | 428/68 |
| 6,880,194 B2 | * | 4/2005 | O'Donnell et al. | 14/69.5 |
| 7,128,357 B1 | * | 10/2006 | Carroll | 296/61 |
| 2006/0284439 A1 | * | 12/2006 | Carroll | 296/61 |
| 2006/0288501 A1 | * | 12/2006 | Thygesen | 14/69.5 |
| 2007/0284904 A1 | * | 12/2007 | Carvalho | 296/57.1 |

* cited by examiner

*Primary Examiner*—H Gutman
(74) *Attorney, Agent, or Firm*—Joe D. Calhoun

(57) ABSTRACT

A device providing a ramp into a truck bed, and extending a truck bed for the carrying of vehicles (such as ATVs) and items that are too long to carry with the truck tailgate raised. One embodiment is essentially a parallel pair of nested ramps, extenders and casings, each respective ramp telescopically and slidably received within a respective extender telescopically and slidably received within a respective casing. Lockpins inserted within holes aligned in the sidewalls of each casing and truckbed extender (and perhaps in each ramp), while they are in a desired configuration such as fully retracted (nested) or fully extended, prevent departure from that desired configuration.

17 Claims, 12 Drawing Sheets

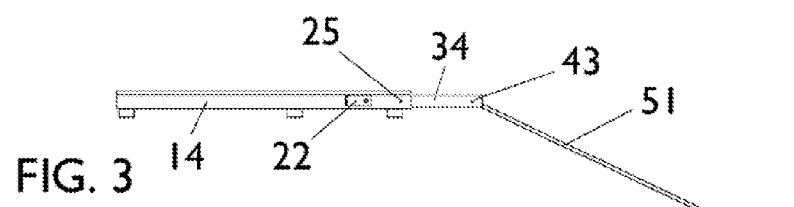
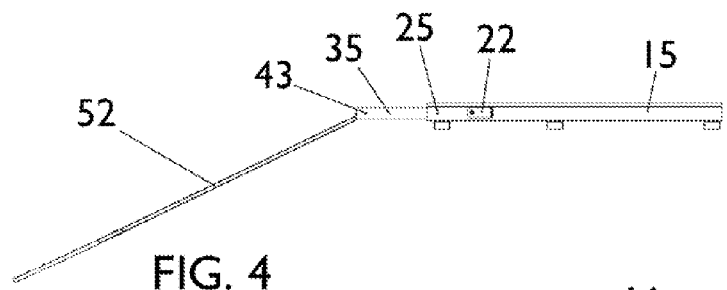
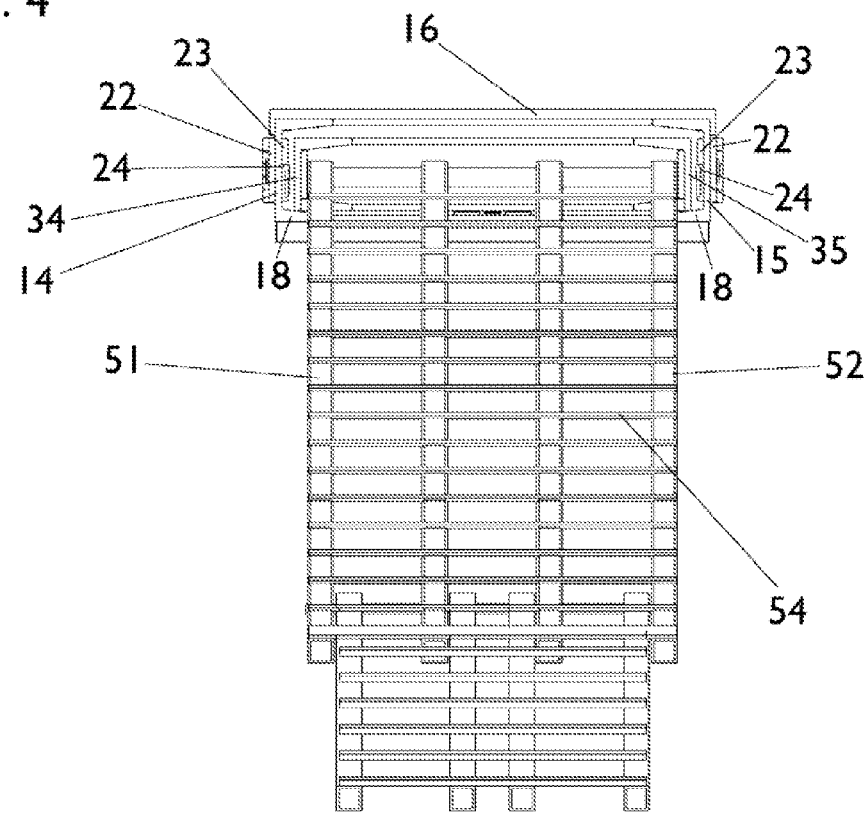

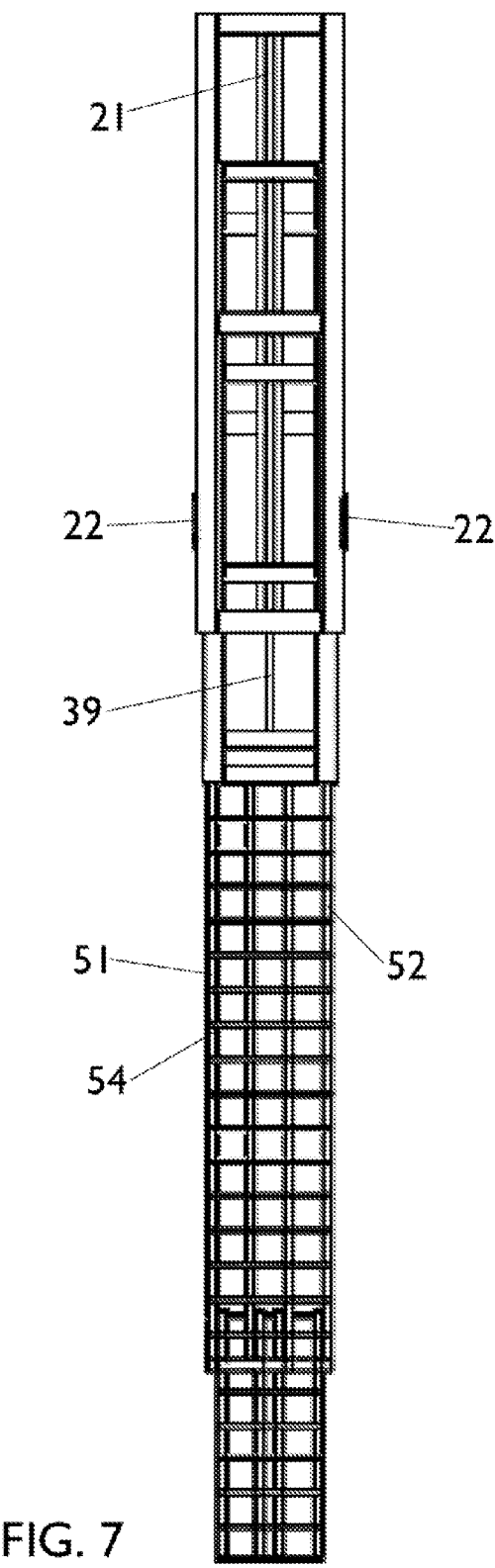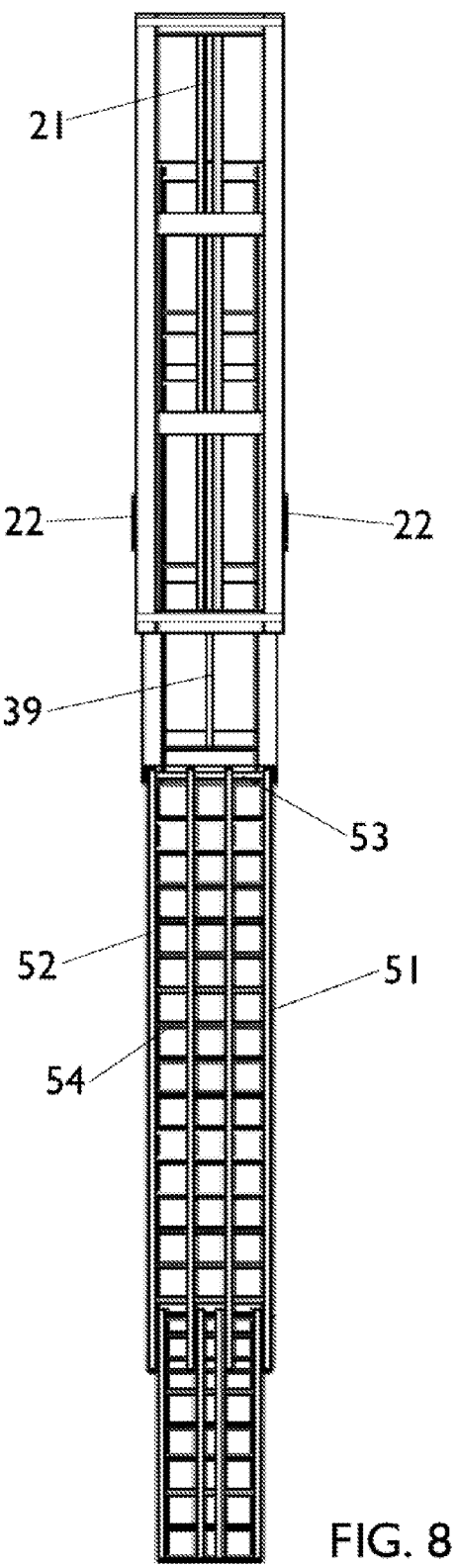
FIG. 7
FIG. 8

TRUCK BED EXTENDER AND TELESCOPING RAMP

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to devices providing a ramp into a truck bed, and extending a truck bed for the carrying of vehicles that are too long to carry with the tailgate raised.

(2) Description of Related Art Including Information Disclosed 37 CFR 1.97 and 1.98

Pickup trucks have become more prevalent, and their uses have become more varied. All terrain vehicles (ATVs) and similar vehicles have likewise become more commonplace, and often are a necessity for many agricultural and recreational endeavors. ATVs are often transported in the bed of a pickup truck. And although the overall size of some pickup trucks has increased, the length of some truckbeds has either decreased or otherwise been rendered less capable of meeting the increasing needs of pickup truck users; one prime example is the increasing use of toolboxes and lockers that often essentially span the width of the truckbed, and are attached to the truck near the forward wall of the truckbed beneath the rear window of the cab of the pickup truck. Moreover, some pickup trucks are sold with shortened truckbeds. Many pickup trucks have gotten taller as well, making it more difficult to load items into the truckbed. Similarly, pickup trucks often load or unload items in hilly terrain, making loading or unloading more difficult when the truckbed is uphill from the loading area. There is indeed a need for a manner of extending the length of the truckbed, and possibly providing a ramp to assist in loading the truckbed with ATVs or other items for transport.

Devices to facilitate ramping into carrying vehicles such as pickup trucks have been available for several years. Known in the art are the following, arguably related to the patentability of the present invention:

| U.S. Pat. No. | ISSUE DATE | 1st NAMED INVENTOR |
| --- | --- | --- |
| 4,864,673 | Sep. 12, 1989 | Adaway |
| 5,244,335 | Sep. 14, 1993 | Johns |
| 5,273,335 | Dec. 28, 1993 | Belnap |
| 5,312,149 | May 17, 1994 | Boone |
| 5,468,114 | Nov. 21, 1995 | Hickerson |
| 5,536,958 | Jul. 16, 1996 | Otis |
| 5,803,523 | Sep. 8, 1998 | Clark |
| 6,447,040 | Sep. 10, 2002 | Young, Sr. |
| 6,454,338 | Sep. 24, 2002 | Glickman |
| 6,722,721 | Apr. 20, 2004 | Sherrer |
| 6,749,246 | Jun. 15, 2004 | Lanwehr |
| 6,811,067 | Nov. 2, 2004 | Muizelaar |
| 6,834,903 | Dec. 18, 2004 | Harper |

U.S. Pat. No. 5,468,114 issued to Hickerson discloses a truck loading device comprising a frame fixedly secured to the truck bed, and having a pair of parallel slideways between which a forward ramp slides; a rearward ramp is hingedly attached to the forward ramp's rear edge. In operation, the rearward ramp (a substitute tailgate) is hinged down to its horizontal position (aligned with the attached forward ramp, and secured), then the two-ramp assembly is pulled rearward until hook members engage abutment members of the frame to stop further rearward pulling of the ramps. This patent does not disclose a telescopically sliding ramp slidably received within the tailgate extension.

U.S. Pat. No. 5,244,335 issued to Johns discloses a telescopic tailgate ramp comprising a base tray holding a series of telescopically connected trays that replace the tailgate when in their nested retracted configuration, and which form a ramp when extended telescopically. This patent does not disclose a casing anchored to a truck bed, like the invention described herein; neither does this patent disclose a telescopically sliding tailgate extension.

U.S. Pat. No. 5,803,523 issued to Clark et al discloses an extendable support system comprising a series of support panels slidably interlocked to adjacent support members by slide rails, and having stop tabs configured to limit the extension of each panel. This patent does not disclose a casing anchored to a truck bed, a telescopically sliding tailgate extension slidably received within the casing, or a hinged attachment of the trailing edge of the ramp to the rearmost edge of the tailgate extension.

U.S. Pat. No. 6,749,246 issued to Lanwehr discloses tailgate ramps having sections that extend via a pivoting connection at each end, the end edge of one section also including a downward opening C-channel that essentially hooks the end of the truck to attach the ramp to the truck. This patent does not disclose a casing anchored to a truck bed, a telescopically sliding tailgate extension slidably received within the casing, or a telescopically sliding ramp.

Other unpatented prior art my include ramping systems common on many "18-wheeler" trailers, wherein the unjointed ramp slides rearward on slide rails from beneath the trailer, stopping when fully extended.

BRIEF SUMMARY OF THE INVENTION

Although the ramping device of the present invention has several embodiments, the invention described essentially includes (comprises) a truckbed extender telescopically and slidably received within a casing (anchored to a truckbed, and having a rearmost opening through which the truckbed extender may extend rearward). The user may slide the extender out of the casing, essentially cantilevering it over the truck tailgate opened in its horizontal position. There may also be a ramp telescopically and slidably received within that extender (having a rearmost portal through which the ramp may extend rearward).

One primary object of the present invention is to provide a truckbed extender that readily extends from a retracted and protected configuration when needed (such as, for example, to support the vehicle(s) too long to be carried in the truckbed with the tailgate up), and readily retracts into a protected casing when not needed.

Another primary object of the present invention is to provide a ramp that can readily be extended for use, then readily retracted for non-use or partially retracted to provide support for a truckbed extender supporting a vehicle that is too long to be carried in the truckbed with the tailgate up.

Another primary object of the present invention is to provide a combination truckbed extender/ramp.

It is another object of the present invention to provide a combination truckbed extender/ramp that minimizes the time and effort required to ramp one or more ATVs or similar vehicle(s) into a truckbed.

Other objects will be apparent from a reading of the written description disclosed herein, together with the claims.

BRIEF DESCRIPTION OF THE SEVERAL VIEWS OF THE DRAWINGS

FIG. 3 depicts an elevation view of the left side of the invention of FIG. 2.

FIG. 4 depicts an elevation view of the right side of the invention of FIG. 2.

FIG. 5 depicts an elevation view from rearward, of the invention of FIG. 2.

FIG. 7 depicts a top plan view of the invention of FIG. 2.

FIG. 8 depicts a bottom plan view of the invention of FIG. 2.

FIGS. 1 through 24 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

Figure 1:
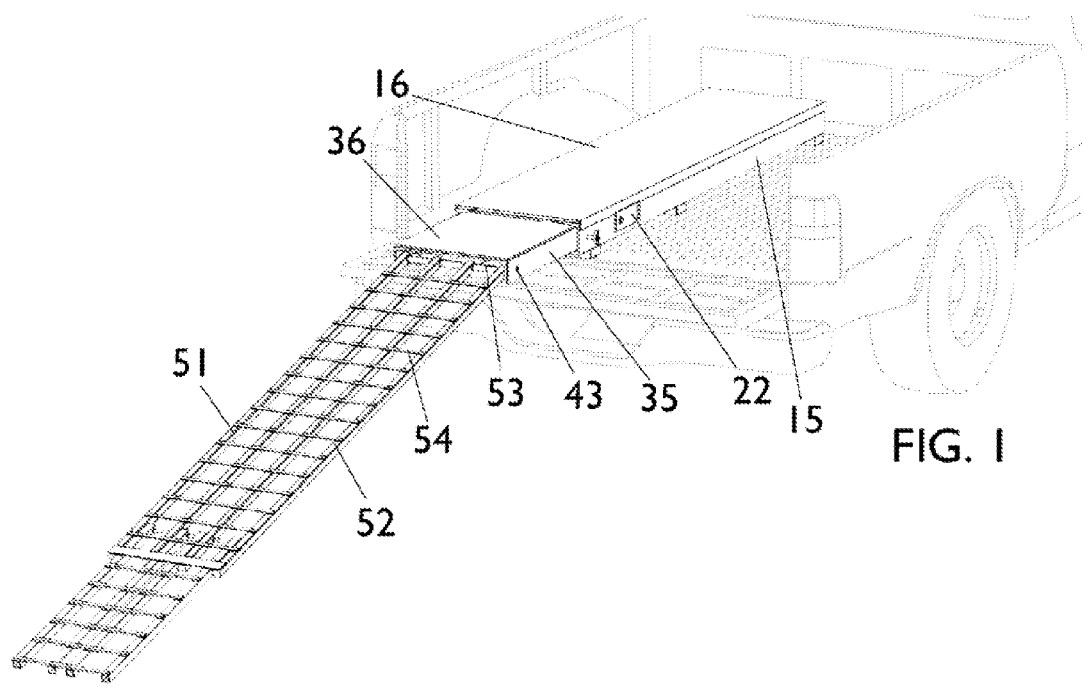
FIG. 1 depicts a perspective view of one single-casing version of the invention, in its fully extended, ramping configuration, and with the rear portion of a hypothetical truck in phantom; a second such casing and extender may be anchored within the truckbed beside the one depicted.
Figure 2:
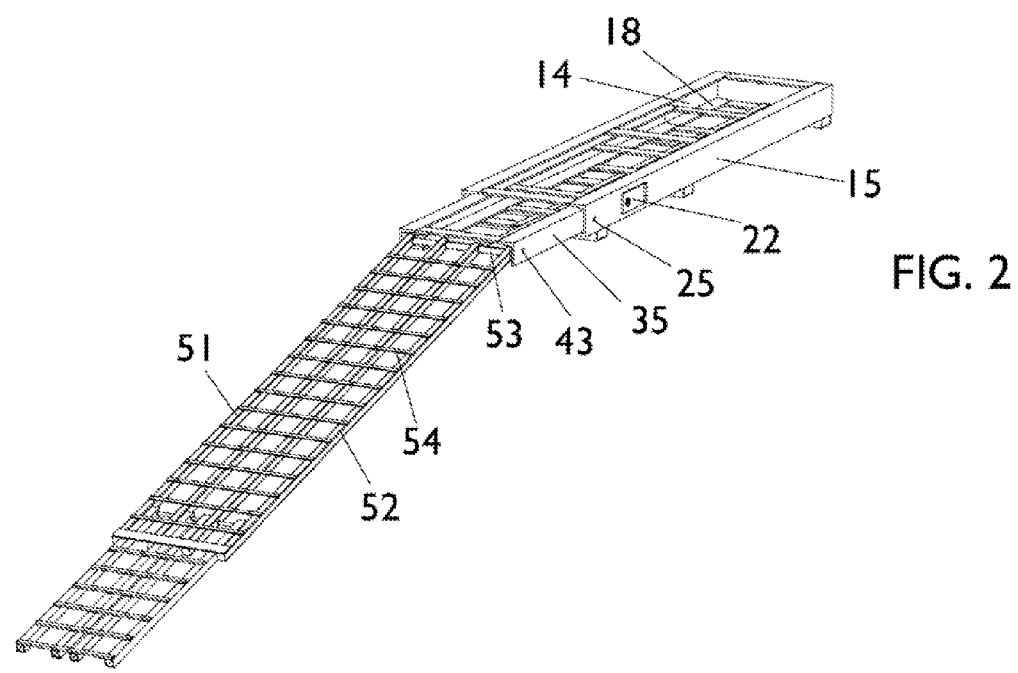
FIG. 2 depicts a perspective cutaway view of the invention of FIG. 1, with the cover panel of the casing and the extender coverframe removed, as well as the lockpin.
Figure 6:
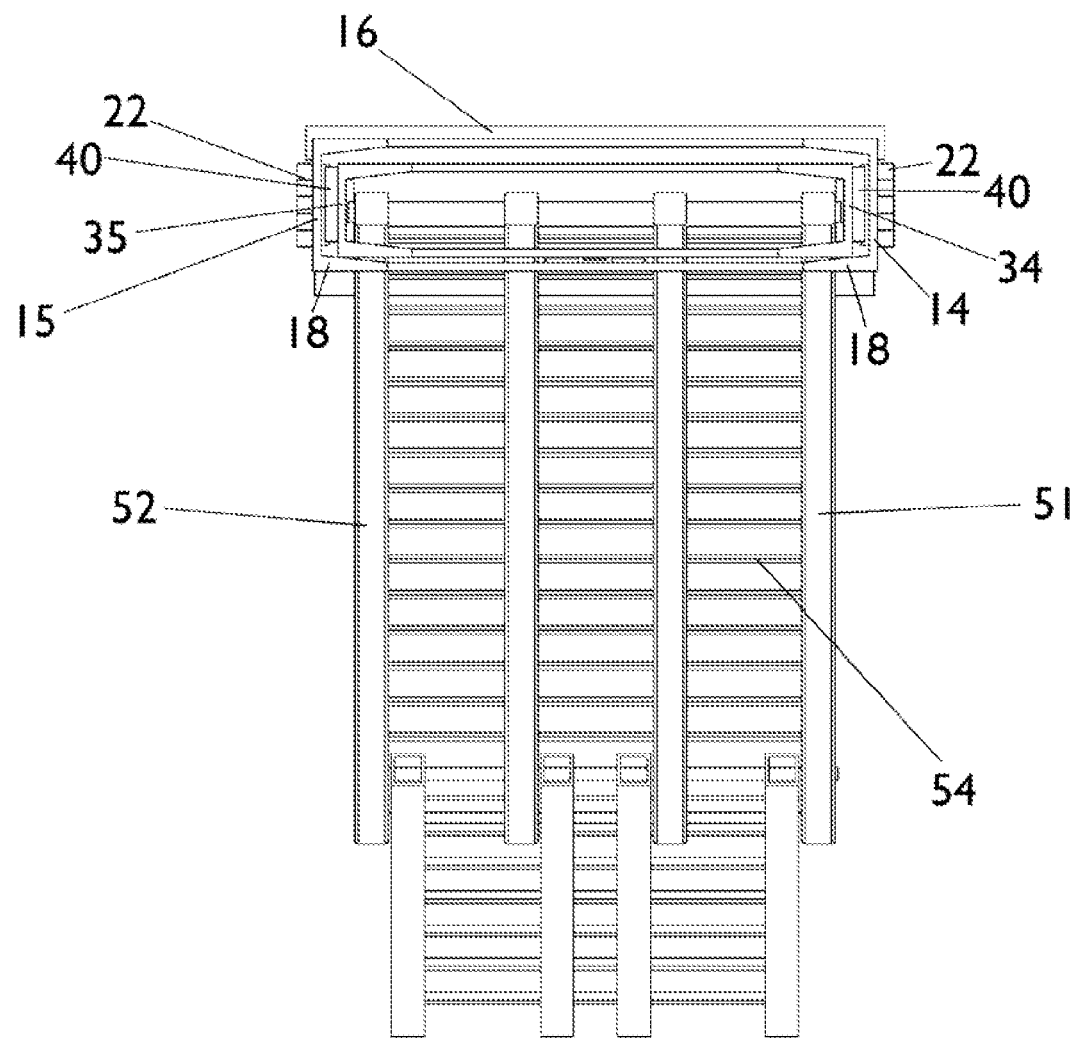
FIG. 6 depicts an elevation view from forward, of the invention of FIG. 2.
Figure 9:
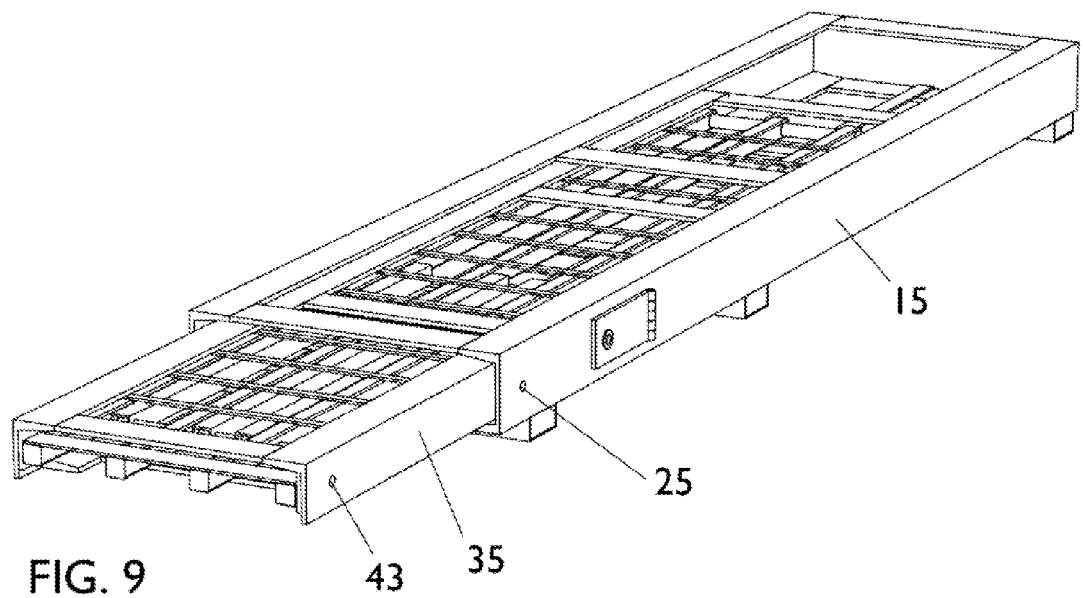
FIG. 9 depicts a perspective view of the invention of FIG. 2, after the ramp tip is hinged inward and the ramp is fully retracted to within the truckbed extender.
Figure 10:
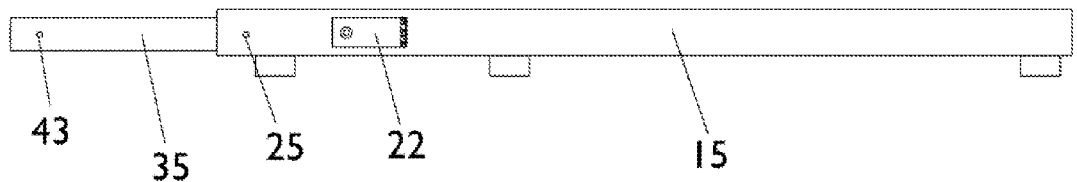
FIG. 10 depicts an elevation view of the left side of the invention of FIG. 9.
Figure 11:
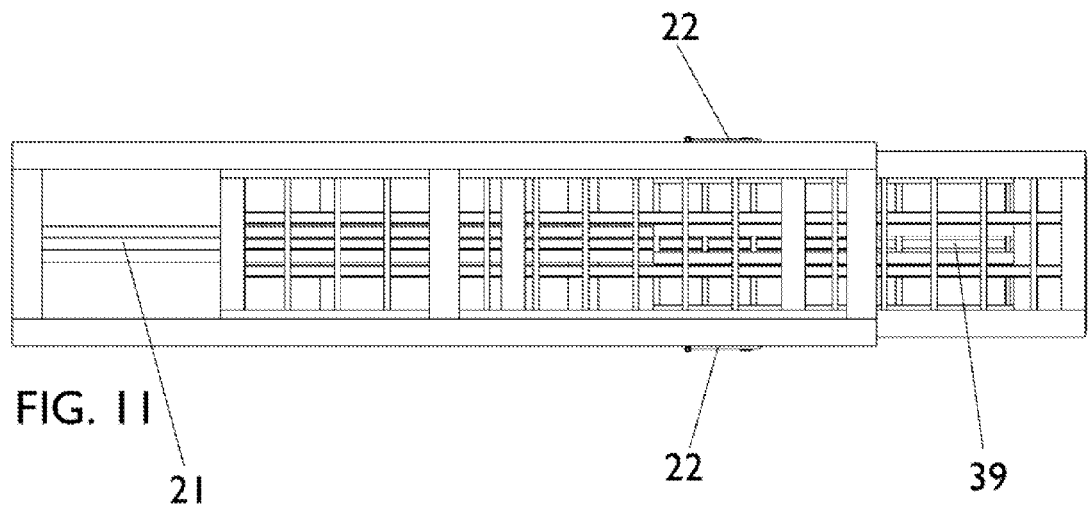
FIG. 11 depicts a top plan view of the invention of FIG. 9.
Figure 12:
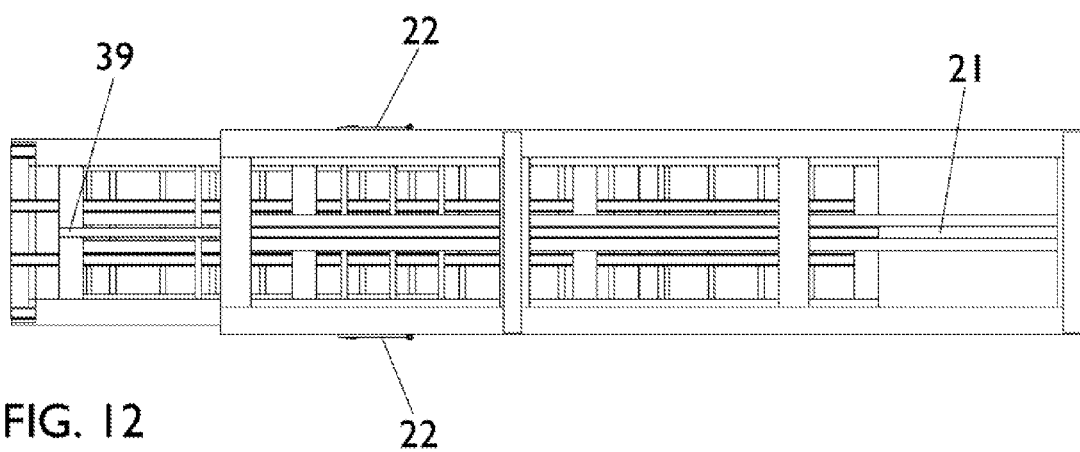
FIG. 12 depicts a bottom plan view of the invention of FIG. 9.
Figure 13:
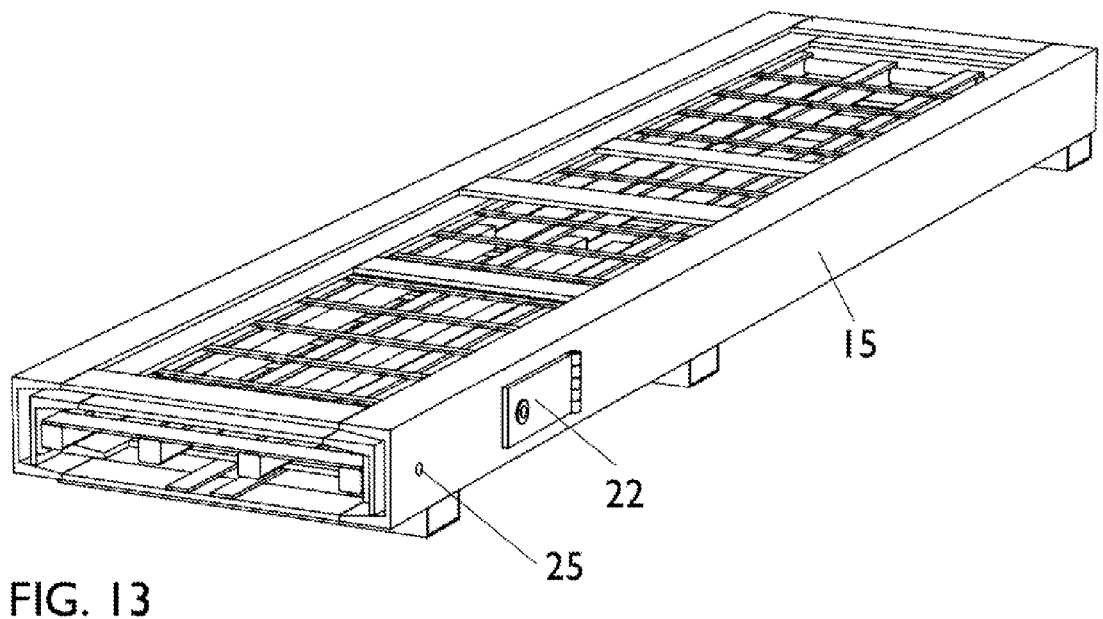
FIG. 13 depicts a perspective view of the invention of FIG. 9, after the truckbed extender (with ramp within) is fully retracted to within the casing.
Figure 14:
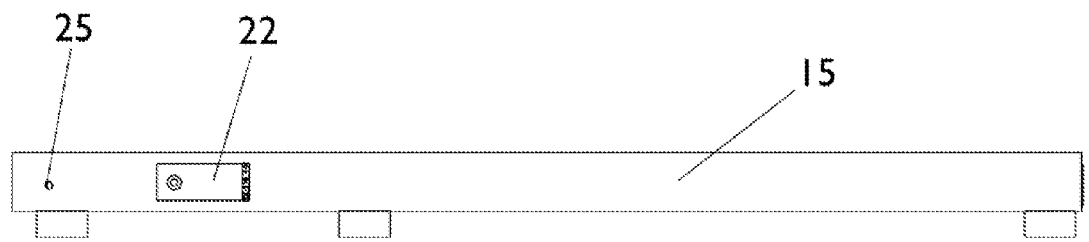
FIG. 14 depicts an elevation view of the right side of the invention of FIG. 9.
Figure 15:
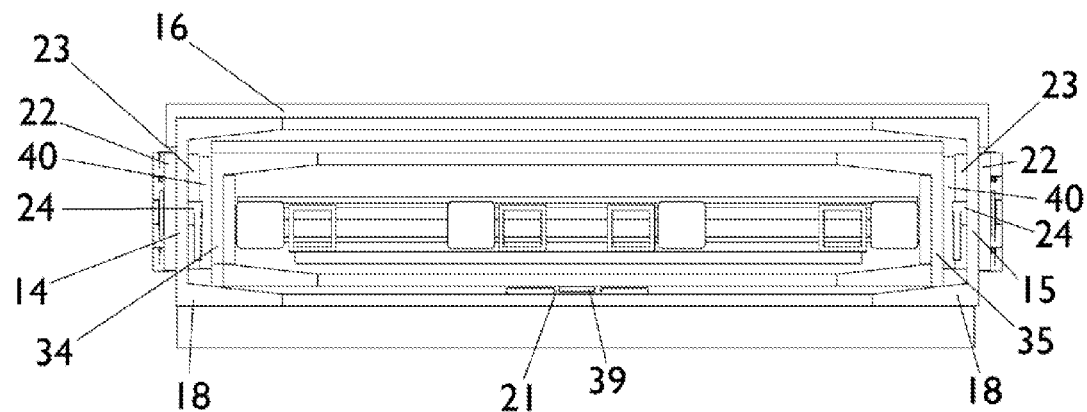
FIG. 15 depicts an elevation view from rearward, of the invention of FIG. 14.
Figure 16:
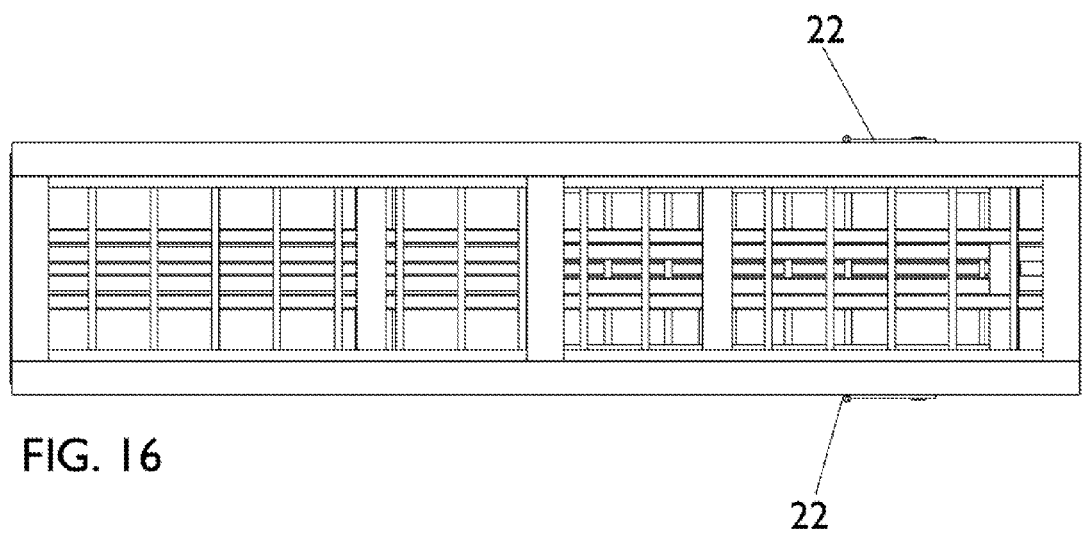
FIG. 16 depicts a top plan view of the invention of FIG. 14.
Figure 17:
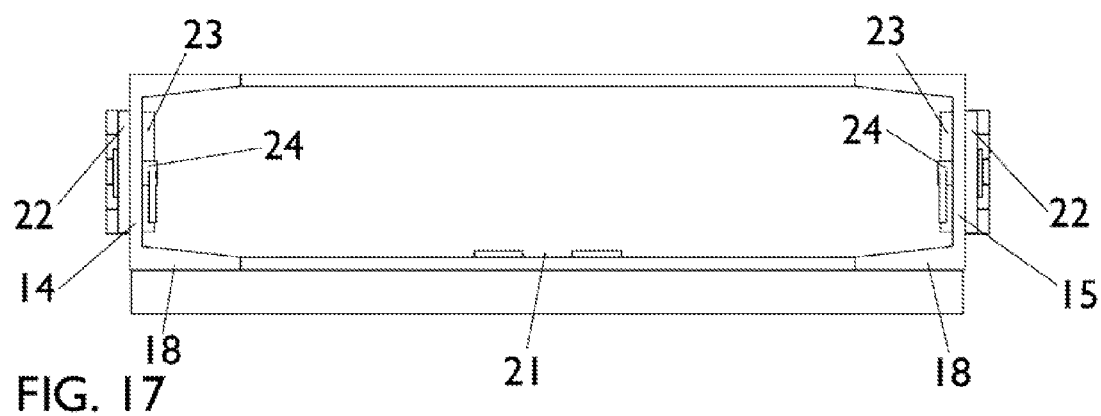
FIG. 17 depicts an elevation view from rearward, of a casing in isolation.
Figure 18:
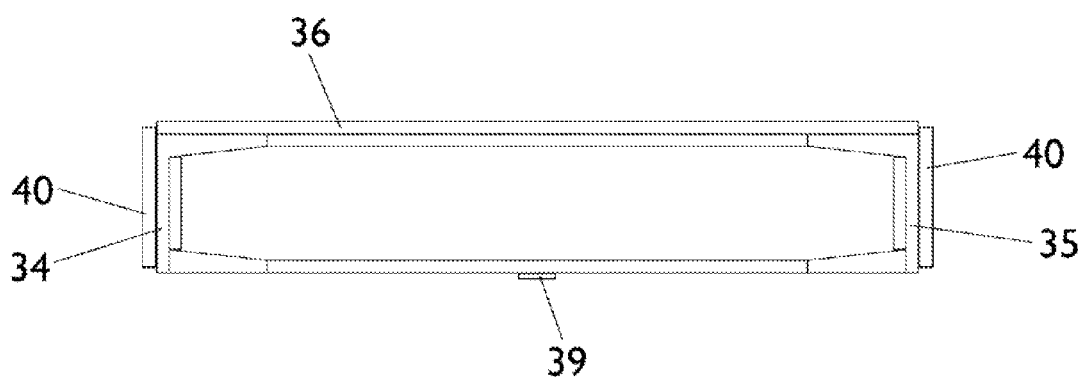
FIG. 18 depicts an elevation view from rearward, of a truckbed extender in isolation.
Figure 19:
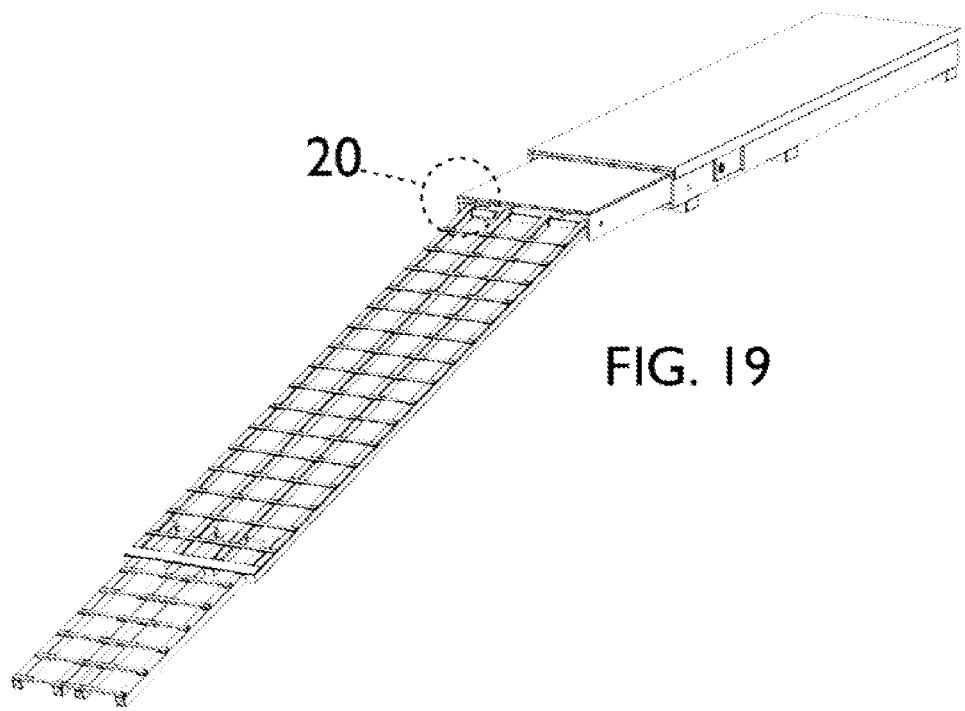
FIG. 19 shows the location of cutaway FIG. 20, at the encircled location.
Figure 20:
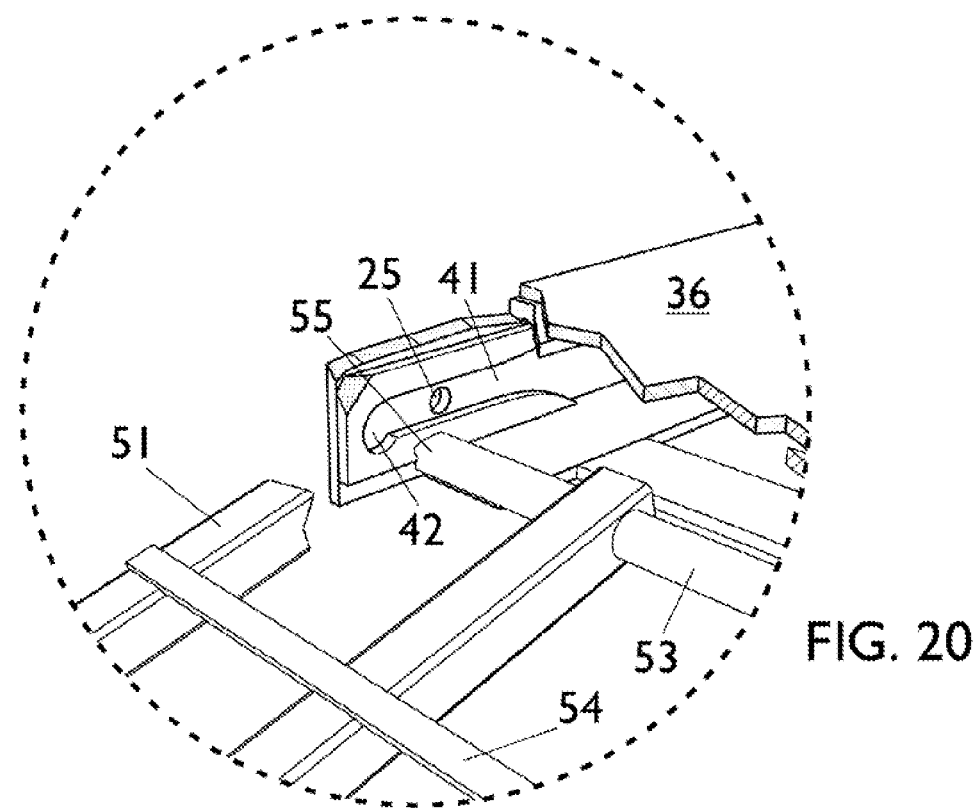
FIG. 20 depicts a cutaway at circle 20 of FIG. 19, with portions of the casing, extender and ramp cut away.
Figure 21:
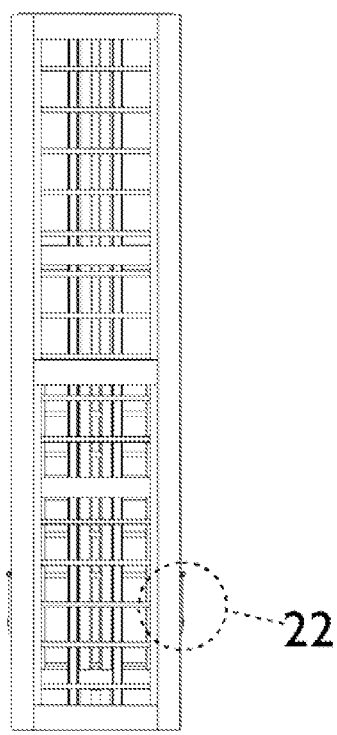
FIG. 21 shows the location of cutaway FIG. 22, at the encircled location.
Figure 22:
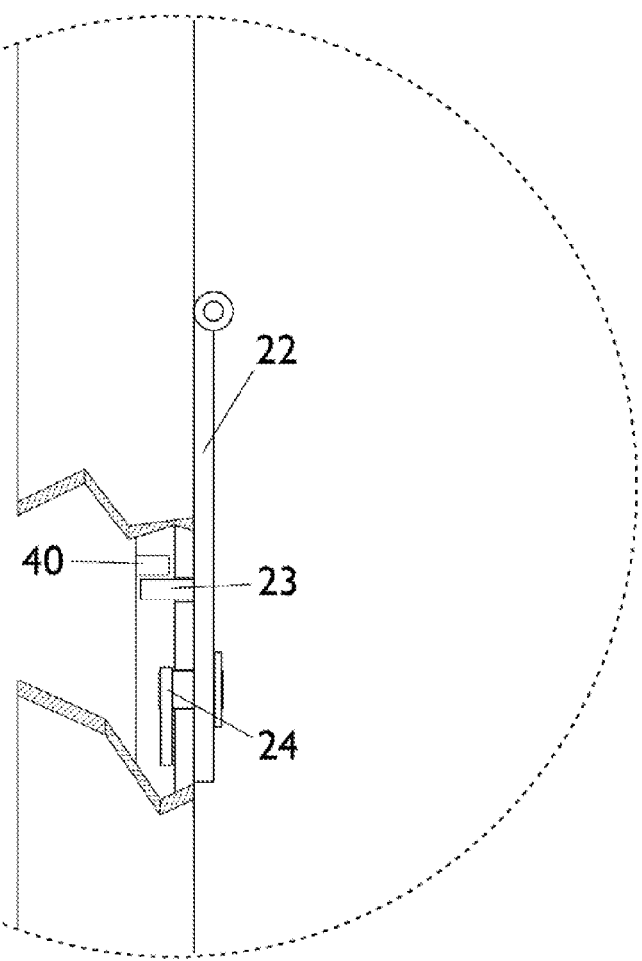
FIG. 22 depicts a cutaway at circle 20 of FIG. 19, with portions of the casing and extender cut away.
Figure 23:
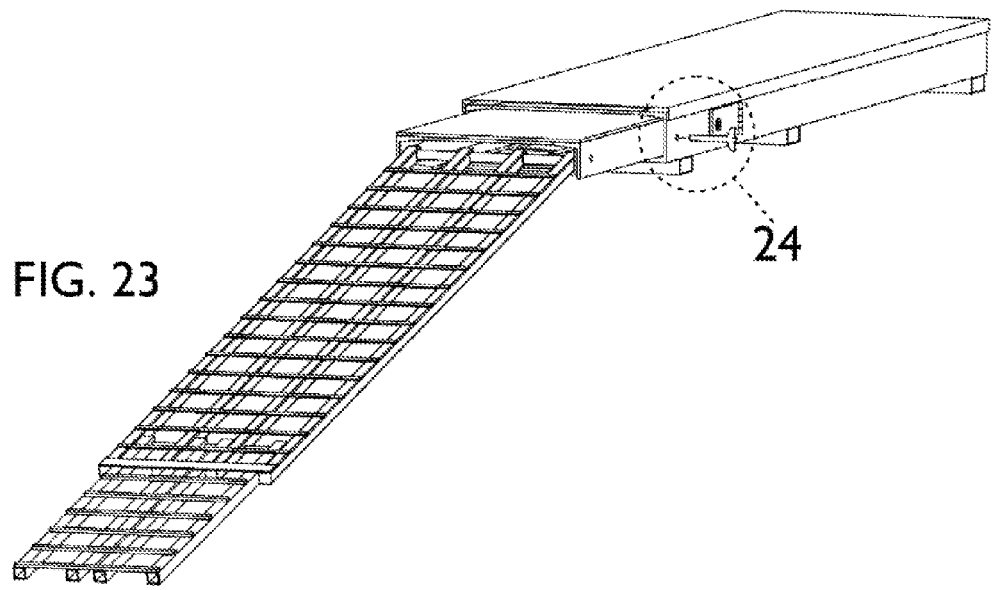
FIG. 23 shows the location of cutaway FIG. 24, at the encircled location.
Figure 24:
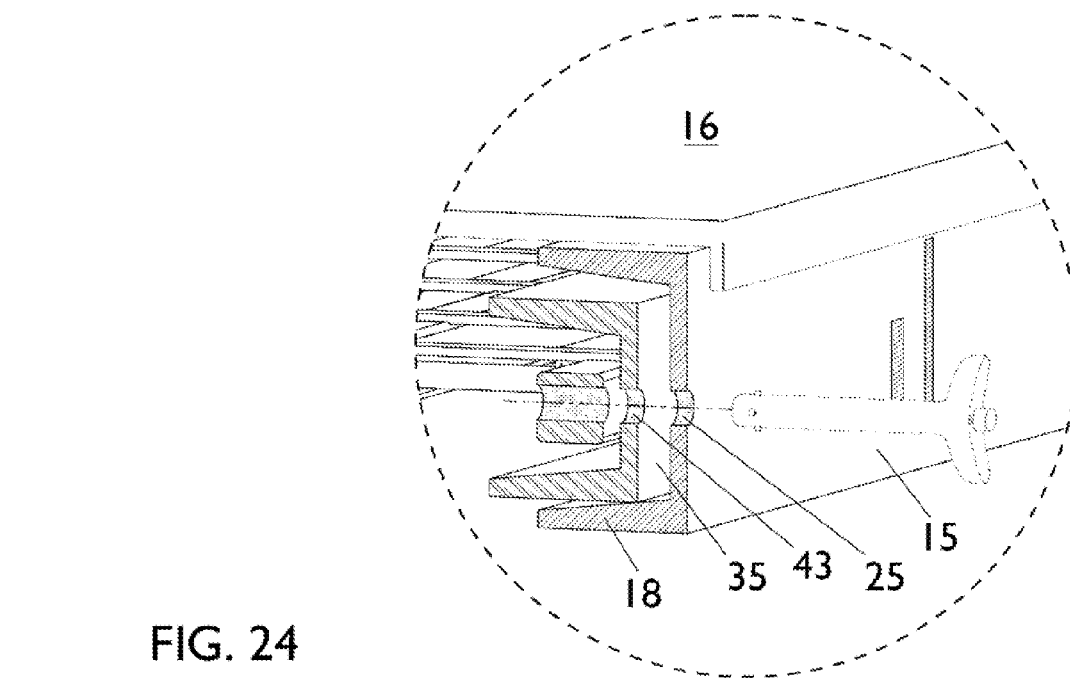
FIG. 24 depicts a cutaway at circle 24 of FIG. 23, with portions of the casing and extender cut away.

For the sake of simplicity and to give the claims of this patent application the broadest interpretation and construction possible, the following definitions will apply.

The term "rearward" or derivative thereof essentially means toward the back end of the carrying vehicle, or further in that direction relative to a reference point.

The term "forward" or derivative thereof essentially means toward the front end of the carrying vehicle, or further in that direction relative to a reference point.

The term "peripheral" or derivative thereof essentially means toward the side of the carrying vehicle (or its bed) nearest to the point of reference, or further in that direction relative to a reference point, for example, for an extender/ramp having a width of less than half that of the truckbed, mounted on the left (driver's) side of the truck, the peripheral side would be nearer that left side of the truckbed.

The term "central" or derivative thereof essentially means toward a central longitudinal axis of the carrying vehicle bed, or further in that direction relative to a reference point; for example, for an extender/ramp having a width of less than half that of the truckbed, mounted on the left (driver's) side of the truck, the central side would be more toward the center of the truckbed than the left side of the truckbed.

The term "longitudinal" essentially means along the longer dimension of the device.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although construction material essentially comprises steel, it may include any material capable of providing the necessary structural rigidity and extension support. Such materials may include (for example) metals and alloys, polymers and plastics, and mixtures and combinations thereof.

The bed casing(s) may each essentially be a metal housing having a bed panel anchored atop the surface of a truck bed; such anchoring may be by bolts, or any other means accomplishing such anchoring, preferably strong and durably but not necessarily permanently. The bed casing may also include spacers, so that the bed panel is elevated above upstanding curvatures or other features atop the truckbed that may hinder or obstruct the anchoring to the truckbed and/or movement of the truckbed extender over the lowered tailgate; such spacers essentially allow the extender to cantilever over the tailgate.

The casing may include an upper cover panel opposite the bed side, which may be removaby affixed to the casing by screws or any means accomplishing such affixation. The panel(s) need not be solid paneling (having no ports or other apertures therein); the bed panel merely needs to have sufficient area and structural integrity to anchor the device to the truck bed, and to facilitate the telescopic sliding of the extender encased within the casing.

The casing also includes a central sidewall and a peripheral sidewall upstanding from the bed panel, preferably from opposite side edges of the bed panel, and supporting the cover panel. There may be a forward sidewall enclosing the foremost opening defined by the two panels and two sidewalls. The casing preferably has no rearward sidewall enclosing the rearmost opening defined by the two panels and two sidewalls, because such an opening is needed to enable the extender to telescopically slide out the casing and extend atop the lowered tailgate of the carrying vehicle; any rearward sidewall should be removable or capable of pivoting, to provide the necessary rearmost opening in the casing.

The casing should provide an interior slide surface along its forward-to-rearward length, likely raised along its longitudinal length, preferably atop the bed panel near the juncture with each sidewall. Preferably, the casing also includes at least one guide track or channel, extending at least from the rearmost opening forward at least approximately halfway up the length of the casing; this rearward region is the approximate area in which the forward portion of the extender remains within the casing when the extender is cantilevered over the open tailgate, such overlapping adding strength to the extender when extended atop the lowered tailgate. Although such guide track(s) or channel(s) may be made by any means for accomplishing such guidance, one such means includes attaching at least two parallel slats along a central longitudinal axis atop the bed panel, upraised above the bed panel approximately the same amount as the raised slide surface(s) along the juncture of the sidewalls and the edges of the bed panel. The space between two such parallel slats should be sized to accept a guide rail downstanding beneath the bottom surface of the extender when encased within the casing.

The invention also includes one or more truckbed extenders telescopically and slidably nested within one or more casings. Each truckbed extender should have a stop protruding off one or both sidewalls, which will interact with a similar stopping means (preferably on the interior of the casing) to prevent the extender from sliding completely out the rear end of the casing.

In one embodiment, a casing sidewall includes a stop-port; a hasp is hingedly affixed to the outer sidewall of the casing, with the perpendicular hasp-end oriented to protrude through (and past) the stop-port when the hasp is hinged down in its stop position. When a rearward portion of the truckbed extender slides rearward out the rearmost opening in the casing, moving into its extended position cantilevered over (atop) the lowered tailgate, the protruding stop on the truckbed extender contacts the protruding hasp-end on the casing to prevent further rearward extension of the truckbed extender.

There may also be a means of locking the hasp in its hinged down position, such as a cam lock or a hasped-loop for accepting a padlock or similar locking device on the outer surface of the casing sidewall.

There may be cooperating pairs of casing/extender stops on both longitudinal sides of the casing and extender.

The extender should further provide a means of stopping or catching complete extension (removal) of the ramp rearward from the extender; ideally, the ramp should stop sliding rearward out the rearmost opening of the extender when the ramp's foremost edge is at or near the rearmost edge of the extender supporting it. One such means includes a pair of journal ends outstanding essentially perpendicularly from the foremost end of the ramp siderails, and corresponding sockets, notches or detents in the rearmost end of the extender sidewalls. In this embodiment, each ramp siderail rests upon and slides rearward atop a raised slide surface of the casing; as each journal end approaches the rearmost opening of the extender, a journal channel, essentially leads the journal ends into the socket at the end of the journal channel. The journal ends within the sockets essentially act as a hinge, allowing the fully extended ramp to pivot or tilt downward from the extender to the ground to form the ramp.

The casing should further provide a means of stopping retraction or re-nesting of the extender forward into the casing; ideally, the extender should remain extended and cantilevered over the lowered tailgate, both while loading a vehicle up the ramp and sometimes while carrying a vehicle that is too long to be carried with the tailgate up. Accordingly, the extender may function as a truckbed extender, effectively extending the truckbed (at least for vehicle-carrying purposes) essentially the length added by the lowered tailgate. One such retraction-stopping means includes a cooperating pair of apertures in the casing and the extender, aligning when the extender is in the desired extension(s) and accepting a lockpin inserted therein. One embodiment of a lockpin is a pin having a perpendicular portion (or crook) preventing complete insertion of the lockpin into and through the casing aperture; the outer end of the perpendicular portion or crook is gravity biased downward, so that the lockpin may essentially remain in place. In another version, there may be an L shaped bracket outstanding over the aligned holes; thereby preventing accidental removal of the crooked lockpin absent sufficient intended rotation and lifting necessary for the lockpin to clear the L shaped bracket.

Another embodiment of the lockpin is essentially a T-shaped quick-connect pin known in the field; this type of lockpin is depicted in FIG. 1. The vertical portion of the T is essentially a metal tube having opposite holes near the lower tip, through which portions of ball bearings (within the tube) may project unless the user depresses a spring-loaded button on the top of the T (between the horizontal arms of the T) to allow the protruding portions of the ball bearings to retract within the tube. Such quick-connect pins allow easy insertion of a lockpin through aligned holes, whereupon the protruding portions of ball bearings essentially prevent removal of the lockpin until the button is depressed enough to allow retraction of the ball bearings.

The invention includes a plurality of casings with extenders with ramps (with or without tips) nested within. Typically, each casing is anchored in position so that its respective extender and ramp is aligned to be beneath the respective front-back pair of wheels of the vehicle to be carried.

One general embodiment includes a device for effectively extending the rearward length of the bed of a pickup truck, including (comprising) a longitudinally extending casing anchored to the bed of the truck, and an extender telescopically and slidably received within the casing for slidably extending rearward atop the truck tailgate in its horizontal position. The casing comprises a bed panel having a longitudinal peripheral edge and an opposite longitudinal central edge, together with a peripheral sidewall and an opposite central sidewall upstanding from the respective bed panel longitudinal edges; it also includes an upper cover panel supported atop the casing sidewalls. The casing panels and sidewalls have rearmost edges defining a rearmost opening. The bed panel comprises raised slide surfaces upstanding adjacent each respective sidewall; the bed panel further comprises a means of guiding the sliding of the extender within the casing. Each of the respective casing sidewalls includes a means of stopping the sliding of the extender within the casing.

The extender has a longitudinal peripheral edge and an opposite longitudinal central edge, together with a peripheral sidewall and an opposite central sidewall upstanding from the respective extender longitudinal edges; it also has an upper coverframe supported atop the extender sidewalls. The extender also comprises slide surfaces downstanding from each respective extender sidewall and interfacing atop the respective upraised slide surfaces of the bed panel. The extender may further comprise a means of guiding the sliding of the extender within the casing. Each of the respective sidewalls may further include a means of stopping the sliding of the extender within the casing.

In a more particular version, the casing guiding means comprise a parallel pair of slats affixed along a central longitudinal axis atop the bed panel, forming a guide track upraised no more than the raised slide surfaces and defining a guide channel between said slats. The extender guiding means include a downstanding guiderail acceptable within the bed panel guide channel.

In a more particular version, the stationary stop means comprise a forward slot and include a hasp hinge-mounted to a forward exterior surface of the casing sidewall. The hasp has a stop-end pivotably insertable through the slot, protruding inward to form a stationary stop intruding toward the opposite respective sidewall of the casing; the extender stop means include a dynamic stop outstanding toward that stationary stop (in closest rearward proximity), the sliding of the extender rearward within the casing causing each respective extender stop to move into contact with its respective closest casing stop, preventing further rearward sliding of the extender. For support enabling the extender to withstand significant downward force, the stoppage of rearward sliding of the extender out of the casing ideally occurs when a substantial rearward portion of said extender remains within the casing.

In another particular version, the stationary stop further comprises a means of locking the stop-end of the casing in its stop position. This is an anti-theft feature, preventing removal of the ramp or extender from the pickup. Another feature involves safety, especially when the truck is carrying a heavy or overly long ATV atop the extender (with the tailgate down). Each respective casing sidewall may further include a rearward hole, and each respective extender sidewall may further include a forward hole alignable with the respective rearward hole of the respective casing sidewall when the extender stops are in contact with the casing stops. The device further may then include quick-connect pins or other lockpins, each insertable through respective aligned holes for preventing forward sliding of the extender within the casing.

Another particular version includes a ramp telescopically and slidably received within the extender. In one such embodiment, the truckbed extender and extender coverframe and sidewalls have rearmost edges defining a rearmost portal. Each of the respective extender sidewalls further including a rearward journal channel ending in a rearmost socket. The ramp comprises a longitudinal peripheral siderail having a foremost end and a rearmost end, together with an opposite longitudinal central siderail having a foremost end and a rearmost end; the foremost ends each have a journal port. The ramp further includes a ramp surface affixed between the siderails; the siderail foremost ends include outstanding journal ends, each of which protrudes toward a respective extender sidewall. Each respective siderail has a lowermost slide-edge interfacing atop a respective slide surface of the extender baseframe. The sliding of the ramp rearward within the extender moves the journal ends into the extender journal channel until mating with the extender socket to temporarily form a hinge connection.

The ramp surface may include a plurality of ramp rungs, including a foremost rung having opposite journal ends, each of which protrudes through a respective journal port toward a respective extender sidewall. The sliding of the ramp rearward within the extender moves the journal ends into the extender journal channel until mating with the extender socket to temporarily form a hinge connection.

In another particular version, the ramp further comprises an extension tip hingedly mounted near said rearmost end of said ramp. In one such embodiment, the ramp further includes a rearmost section, and the tip includes a foremost section and a rearmost section. The hinge mounting occurs on an underside of a ramp rung, with the foremost section of the tip overlapping the rearmost section of the ramp for added strength and stability.

In another preferred version, there is a plurality of parallel ramps, preferably a pair, telescopically and slidably received within an extender telescopically and slidably received within a casing. In this version, the casing may essentially occupy almost all of the truckbed surface area, essentially creating a "false floor" under which one or more extenders with ramps may retract.

In another preferred version, there is a plurality (preferably a pair) of parallel nested ramps, extenders and casings, each respective ramp telescopically and slidably received within a respective extender telescopically and slidably received within a respective casing. One detailed embodiment of this version includes (comprises) a parallel pair of rectangulo-cuboidal casings anchored side-by-side atop the truckbed, extending longitudinally from near the foremost wall of the truckbed rearward to near the foremost surface of the truck tailgate in its vertical position; each such casing includes an anchoring bed panel having a longitudinal peripheral edge and an opposite longitudinal central edge, a peripheral sidewall (14) and an opposite central sidewall (15) upstanding from said respective bed panel longitudinal edges, and an upper cover panel (16) supported atop said casing sidewalls. The casing panels and sidewalls have rearmost edges defining a rearmost opening. The bed panel includes raised slide surfaces (18) upstanding adjacent each respective sidewall. The bed panel further includes a guide channel (21), preferably extending longitudinally along the middle of at least the rearward portion of the casing; the positioning of the forward portion of the extender within this rearward portion of the casing essentially provides overlapping structural strength when the rearward portion of the extender is extended over the tailgate. The guide channel could extend essentially the entire longitudinal distance of the casing.

The central sidewall of the casing includes a medial slot, sized to snugly receive a stop-end or stop-stub (23) of a hasp (22) hinge-mounted to a nearby exterior surface of the casing; due to the hinge mounting of the hasp, the stop-stub is pivotably insertable through that slot, and thereby essentially creates a stationary stop essentially pointing toward the peripheral sidewall of the casing. This stationary stop will be contacted by a stop outstanding from the central sidewall of the truckbed extender; as the truckbed extender is slidably extended rearward out the rearward opening of the casing, such stop-to-stop contact stops such rearward sliding and prevents removal of the extender from the casing. Both sidewalls of the casings and extender may include such cooperating pairs of stops.

The invention may also include a respective truckbed extender telescopically and slidably received within a casing, for slidably extending rearward atop the truck tailgate in its horizontal position to accomplish tailgate extension or as a prelude to deploying a ramp nested within the extender. Each such extender may include a baseframe having a longitudinal peripheral edge and an opposite longitudinal central edge, a peripheral sidewall (34) and an opposite central sidewall (35) upstanding from the respective baseframe longitudinal edges, and an upper coverframe (36) supported atop the extender sidewalls; the portion of the coverframe extending over the tailgate from the rear opening of the casing should be a solid panel, but the remaining portion may be framing. Each extender baseframe and coverframe and sidewalls include rearmost edges forming a rearmost portal. The truckbed extender may also include slide margins or similar slide surfaces on the underside of each respective extender sidewall, and interfacing atop a respective upraised slide surface of the bed panel. The truckbed extender may further include a downstanding guiderail (39) acceptable within the bed panel guide channel, preferably extending the longitudinal length of the extender.

As noted above, at least the central sidewall of each extender may include a dynamic stop (40) outstanding toward the stationary stop of its casing, the sliding of the extender rearward within the casing causing the dynamic extender stop to move into contact with the stationary stop of the casing to prevent further rearward sliding of the extender. The dynamic stop of the extender must be positioned along the extender sidewall to contact the stationary stop of the casing at precisely the moment that the rearward end of the extender is in its most desire rearmost position of extension; if the medial slot on the casing sidewall (and its related hasp stop-stub) are situated near the rearward end of the casing sidewall, then the dynamic stop of the extender will be positioned in an intermediate portion of the extender sidewall.

Each of the extender sidewalls may further include a rearward journal channel (41), at least along the rearward portion of the extender sidewalls. Each channel has a forward opening, and leads to a rearmost cul-de-sac or socket (42) of the extender sidewall; the channels function to channel the foremost end of the ramp into the sockets, to essentially create a temporary pivoting connection between the foremost end of the ramp and its truckbed extender.

Each truckbed extender includes a ramp telescopically and slidably received within, for slidably extending rearward out of the extender rearmost portal. The ramp includes a longitudinal peripheral siderail (51) having a foremost end and a rearmost end, and an opposite longitudinal central siderail (52) having a foremost end and a rearmost end; the foremost ends each ramp include a hole or port for a journal. The ramp further includes a plurality of ramp rungs (54) affixed between the siderails, including a journal rung (53) across the foremost end having opposite journal ends (55); each of those journal ends protrudes through (and is secured within) a respective journal port on the foremost end of a ramp siderail, and extends toward a respective extender sidewall. Each respective siderail includes a lowermost slide-edge interfacing atop a respective upraised slide surface of said bed panel. The pulling of the ramp rearward within the extender moves the journal ends into the extender journal channels until mating with the sockets of the rearward end of the extender siderails, thereby temporarily forming a hinge-like connection between the foremost end of the ramp and the rearmost end of the truckbed extender; this allows the rearmost ends of the ramp siderails to pivot downward to the ground.

In this detailed embodiment, the hasp and stationary stop of the casing may further include a means of locking the stop-stub in its inserted position, especially to prevent theft of the extender and/or its ramp. One such means includes fitting the hasp end opposite the hinge connection with a cam lock (24); when the stop-stub is inserted within the slot, the cam lock is likewise inserted through an opening sized to snugly accept the lockbar rotated by the cam lock, so that operation of the cam lock will essentially rotate the lockbar sufficiently to prevent removal through that snug opening; many typical cam locks, known in the field, are actuated by keys inserted within the cam lock, to both rotate the lockbar and provide more continued locking after removal of the key. Another locking means includes an opening on the hasp end opposite the hinge connection, sized to accept an arcing staple; a pin, bolt or padlock may then be inserted through the portion of the staple extending out of the closed hasp, to prevent opening of the hasp.

One way of preventing the removal of the extender nested within its casing is to insert a lockpin through aligned holes in the casing and extender; preferably the holes will be in one or both rearward casing central and peripheral sidewalls, and one or both of the rearmost extender central and peripheral sidewalls. The aligned holes are sized to accept insertion of a quick-connect pin or other type of lockpin. To prevent extension of the ramp nested within the extender, one or both is its siderails may include a hole alignable with the holes in the casing and extender sidewalls, and the lockpin may be long enough to extend through all three.

When the extender is extended atop the lowered tailgate, such as when ramping an ATV into the truckbed or when transporting the oversized ATV(s) with the tailgate extended, it is important that the extender not retract forward to within the casing. Accordingly, each respective extender sidewall may further include an intermediate hole (45) alignable with the rearward hole of the respective casing sidewall when the extender stop(s) are in contact with the casing stop(s). The aligned holes are sized to accept insertion of a quick-connect pin or other type of lockpin. To prevent extension of the ramp nested within the extender, one or both is its siderails may include a hole alignable with the holes in the casing and extender sidewalls, and the lockpin may be long enough to extend through all three.

The ramp may further include an extension tip hingedly mounted near the rearmost end of the ramp. Ideally there will be some overlapping of a rearward portion of the ramp and a forward portion of the extension tip, to augment the structural strength of the extended ramp when the tip is hinged rearward and outstretching rearward from beneath the rearmost end of the ramp.

Although there may be some variation in assembly, one procedure is as follows. Mount the casing in the truckbed, foremost end close to the foremost wall of the truckbed. Insert any ramp, rearmost end first, through a foremost portal of an extender; then insert the extender, rearmost end first, through the foremost opening of a casing. Then pivot the hasp's stop-end through the slot in the casing sidewall, to effectively capture the extender and any ramp within the casing. A lock may also be applied.

Besides the device disclosed herein, the invention also includes a method of extending the truckbed over the tailgate, and possibly ramping a vehicle into the truckbed. During operation as a ramp, after lowering the truck tailgate to its horizontal position, the user removes any lockpin(s) on each nested unit, then pulls the ramp rearward until its journals are pivotally received within the channel sockets of the extender. Continued pulling will pull the extender out of its casing, the distance from the end of the casing to the end of the lowered tailgate; at this point, further rearward sliding of the extender will be prevented by contact between the stationary stop(s) of the casing and the dynamic stop(s) of the extender. (The user may then re-inserting the lockpin(s) through the rearward hole(s) in the casing and the medial hole(s) in the extender, to prevent movement of the extender in either rearward or forward direction. The stationary stop may also be locked in place.) If needed, the extension tip of the ramp may also be hinged rearward. In general, the method of using the extender/ramping device, after lowering the tailgate, includes the steps of:

(a) pulling the rearmost end of the ramp(s) rearward from the extender(s) until establishing hinging cooperation between the foremost end of each ramp and the rearmost end of its extender; and (b) pulling the rearmost end of the extender(s) rearward from the casing until its stops.

More particularly, the method of using the extender/ramp also may include one or more of the following steps:

(c) if necessary or desired, pivoting the ramp extension tip rearward;

(d) before ramping any overlong vehicle(s) (i.e., too long to carry within the truckbed with its tailgate up), retracting the ramp(s) (and any ramp tip) into the extender(s), and inserting the lockpin(s) to prevent forward movement of the extender into the casing; and (e) after the preceding step, deploying the tie-down means on the rearmost end of the extender.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

I claim:

1. A device for effectively extending the rearward length of the bed of a pickup truck, comprising a longitudinally extending casing anchored to the bed of the truck, and an extender telescopically and slidably received within said casing for slidably extending rearward cantilevered over the truck tailgate when the tailgate is in a horizontal position, said casing comprising a bed panel having a longitudinal peripheral edge and an opposite longitudinal central edge, a peripheral sidewall and an opposite central sidewall upstanding from said respective bed panel longitudinal edges, and an upper cover panel supported atop said casing sidewalls, said casing panels and sidewalls having rear edges defining a rear opening, said bed panel comprising a slide surface adjacent each respective sidewall, said bed panel further comprising a means of guiding said sliding of said extender within said casing comprising a guide channel along a central longitudinal axis atop said bed panel, each of said respective casing sidewalls defining a means of stopping said sliding of said extender within said casing;

said extender comprising a baseframe having a longitudinal peripheral edge and an opposite longitudinal central edge, a peripheral extender sidewall and an opposite central extender sidewall upstanding from said respective extender longitudinal edges, and an upper coverframe supported atop said extender sidewalls, said extender further comprising slide margins beneath each respective extender sidewall and interfacing atop said respective slide surfaces of said bed panel, said extender further comprising a means of guiding said sliding of said extender within said casing comprising a downstanding guiderail slidably acceptable within said bed panel guide channel, each of said respective extender sidewalls further including a means of stopping said sliding of said extender within said casing comprising a stop stub stationed on an interior surface of one of said casing sidewalls and a stop affixed to an outer surface of one of said adjacent extender sidewalls, wherein rearward sliding of said extender within said casing causes said extender stop to contact said casing stop stub to prevent further rearward sliding.

2. A device described in claim 1 above, said means of stopping said sliding comprising a casing sidewall slot and a hasp hinge-mounted to a nearby exterior surface of said casing sidewall, said hasp having a stop-end pivotably insertable through said slot and defining a stationary stop outstanding toward said opposite respective sidewall of said casing, said extender stop means including a dynamic stop outstanding toward said stationary stop, said sliding of said extender rearward within said casing causing said dynamic stop to move into contact with said stationary stop preventing further rearward sliding.

3. A device described in claim 2 above, said preventing of further rearward sliding of said extender out of said casing occurring when a substantial forward portion of said extender remains within said casing.

4. A device described in claim 2 above, said hasp further comprising a means of locking said stop-end in an inserted position selected from the group consisting of a key actuated cassock cylinder extending through a cam hole in said casing sidewall, or a pair of aligned lockholes defined by a hasp plate overlapping a casing sidewall perpendicular plate, said aligned lock holes sized for acceptance of a locking element such as a pin or padlock.

5. A device described in claim 2 above, said casing sidewall further comprising a rearmost hole, said extender sidewall further comprising an intermediate hole alignable with said rearward hole of the respective casing sidewall when said extender stop means is in contact with said casing stop, said device further comprising a lockpin insertable through respective aligned holes for preventing forward sliding of said extender within said casing.

6. A device described in claim 5 above, further comprising a truckbed ramp telescopically and slidably received within said extender:

(a) said extender baseframe and upper coverframe and sidewalls having rear edges defining a rear portal, each of said respective extender sidewalls further including a rearward interior journal channel ending in a rearmost socket;

(b) said ramp comprising a longitudinal peripheral siderail having a foremost end and a rearmost end, and an opposite longitudinal central siderail having a foremost end and a rearmost end, said foremost ends each defining a journal port, said ramp further comprising a ramping surface between said siderails, said siderail foremost ends including outstanding journal ends, each of which protrudes toward a respective extender sidewall, each respective siderail having a lowermost slide-edge interfacing atop a respective slide margin along a longitudinal edge of a respective extender baseframe, said sliding of said ramp rearward within said extender moving said journal ends into said extender journal channel until mating with said extender socket to define a hinge connection.

7. A device described in claim 6 above, said ramping surface comprising a plurality of ramp rungs.

8. A device described in claim 7 above, said ramp further comprising an extension tip hingedly mounted near said rearmost end of said ramp.

9. A device described in claim 8 above, said ramp further comprising a rearmost section, said tip comprising a foremost section and a rearmost section, said hinge mounting occurring beneath said ramp rungs wherein said rearmost section of said ramp overlaps said foremost section of said tip.

10. A device described in claim 9 above, said device comprising a parallel plurality of the truckbed ramps telescopically and slidably received within an extender telescopically and slidably received within the casing.

11. A method of using the device described in claim 8 above, comprising the steps of:
    (a) pulling the rearmost end of each ramp rearward slidingly from its extender until establishing hinging cooperation between the foremost end of said ramp and the rearmost end of its extender; and
    (b) continuing pulling said ramp to slide the extender rearward from its casing until it stops; and
    (c) allowing the rearmost end of the ramp to pivot downward for ground contact.

12. A method described in claim 11 above, further comprising the step of pivoting the ramp extension tip downward for ground contact.

13. A device for effectively extending the rearward length of the bed of a pickup truck and providing a ramp for the truckbed, comprising:
    (a) a parallel pair of rectangulo-cuboidal casings anchored atop the truckbed, extending longitudinally from near the foremost wall of the truckbed rearward to near the foremost surface of the truck tailgate in its vertical position, each such casing comprising an anchoring bed panel having a longitudinal peripheral edge and an opposite longitudinal central edge, a peripheral sidewall and an opposite central sidewall upstanding from said respective bed panel longitudinal edges, and an upper cover panel supported atop said casing sidewalls, said casing panels and sidewalls having rear edges defining a rear opening, said bed panel comprising raised slide surfaces upstanding adjacent each respective sidewall, said bed panel further comprising a guide channel along a central longitudinal axis thereof and upraised less than said raised slide surfaces, each of said respective casing sidewalls defining a rearward slot and including a hasp hinge-mounted to a rearward exterior surface of said casing sidewall, said hasp having a stop-stub pivotably insertable through said slot and defining a stationary stop outstanding toward said opposite respective sidewall of said casing;
    (b) a respective extender telescopically and slidably received within each respective casing for slidably extending rearward cantilevered over the truck tailgate in its horizontal position, each respective extender comprising a baseframe having a longitudinal peripheral extender edge and an opposite longitudinal central extender edge, a peripheral extender sidewall and an opposite central extender sidewall upstanding from said respective extender longitudinal edges, and an upper coverframe supported atop said extender sidewalls, each respective extender baseframe and coverframe and sidewalls having rear edges defining a rear portal, each of said extender longitudinal edges including a slide margin for interfacing atop said respective upraised slide surface of said bed panel, said extender baseframe further comprising a downstanding guiderail slidably acceptable within said bed panel guide channel, each of said respective extender sidewalls including a dynamic stop outstanding toward said respective casing stationary stop, said sliding of each respective extender rearward within its respective casing causing each respective extender stop to move into contact with its respective casing stationary stop preventing further rearward sliding of said extender, each of said respective extender sidewalls further including a rearward interior journal channel ending in a rearmost socket; and
    (c) a ramp telescopically and slidably received within each respective extender for slidably extending rearward out of the extender rear portal, each such ramp comprising a longitudinal peripheral siderail having a foremost end and a rearmost end, and an opposite longitudinal central siderail having a foremost end and a rearmost end, said foremost ends each defining a journal port, each respective ramp further comprising a plurality of ramp rungs periodically affixed between said siderails, including a foremost rung having opposite journal ends, each of which protrudes through a respective journal port toward a respective extender sidewall, each respective siderail having a lowermost slide-edge interfacing atop a respective slide margin along a longitudinal edge of a respective extender baseframe, said sliding of said ramp rearward within said extender moving said journal ends into said extender journal channels until mating with said extender sockets to define a hinge connection;
    (d) wherein the extender extends rearward out the rear opening of the casing, stopping when the rear portal of the extender is past the rearmost edge of the tailgate in its horizontal position, the ramp extending out of the rear portal of the extender with the journal ends of its foremost rung forming a hinge connection with the sockets of the extender sidewalls, thereby allowing the rearmost ends of the ramp siderails to pivot downward to the ground.

14. A device described in claim 13 above, said hasp further comprising a means of locking said stationary stop including a key actuated cassock cylinder extending through a cam hole in said casing sidewall.

15. A device described in claim 14 above, said casing sidewall further comprising a rearmost hole, said extender sidewall further comprising an intermediate hole alignable with said rearward hole of the respective casing sidewall when said extender stop is in contact with said stationary stop, said device further comprising a lockpin insertable through said respective aligned holes for preventing forward sliding of said extender within said casing.

16. A device described in claim 15 above, said ramp further comprising an extension tip hingedly mounted near said rearmost end of said ramp.

17. A device described in claim 16 above, said ramp further comprising a rearmost section, said tip comprising a foremost section and a rearmost section, said hinge mounting occurring on an underside of a ramp rung wherein said foremost section of said tip overlaps said rearmost section of said ramp.

* * * * *